(12) United States Patent  (10) Patent No.: US 8,621,527 B2
Couleaud et al.  (45) Date of Patent: Dec. 31, 2013

(54) AIRCRAFT IN-FLIGHT ENTERTAINMENT SYSTEM WITH ROBUST DAISY-CHAINED NETWORK

(75) Inventors: Jean-Yves Couleaud, Irvine, CA (US); Kenneth A. Brady, Jr., Trabuco Canyon, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 13/463,898

(22) Filed: May 4, 2012

(65) Prior Publication Data

US 2013/0298173 A1  Nov. 7, 2013

(51) Int. Cl.
  *H04N 7/18*  (2006.01)
  *H04N 7/16*  (2011.01)
(52) U.S. Cl.
  USPC .............................. 725/77; 725/76; 725/149
(58) Field of Classification Search
  None
  See application file for complete search history.

(56) References Cited

U.S. PATENT DOCUMENTS

| | | | | |
|---|---|---|---|---|
| 5,929,895 A | * | 7/1999 | Berry et al. | 725/77 |
| 6,611,892 B1 | * | 8/2003 | Sasaki et al. | 710/306 |
| 7,222,358 B2 | * | 5/2007 | Levinson et al. | 725/121 |
| 7,675,849 B2 | * | 3/2010 | Watson et al. | 370/217 |
| 7,715,783 B2 | * | 5/2010 | Girard et al. | 455/3.02 |
| 2003/0208764 A1 | * | 11/2003 | Galipeau et al. | 725/76 |
| 2006/0179457 A1 | * | 8/2006 | Brady et al. | 725/76 |
| 2009/0034540 A1 | * | 2/2009 | Law | 370/400 |
| 2009/0070797 A1 | * | 3/2009 | Ramaswamy et al. | 725/10 |
| 2009/0119721 A1 | * | 5/2009 | Perlman et al. | 725/76 |
| 2009/0149261 A1 | | 6/2009 | Chen et al. | |
| 2010/0162326 A1 | * | 6/2010 | Bonar | 725/77 |
| 2011/0007745 A1 | * | 1/2011 | Schultz et al. | 370/394 |
| 2011/0029998 A1 | * | 2/2011 | Yip | 725/14 |
| 2011/0162016 A1 | * | 6/2011 | Petrisor et al. | 725/77 |
| 2011/0174926 A1 | * | 7/2011 | Margis et al. | 244/118.6 |
| 2011/0219409 A1 | * | 9/2011 | Frisco et al. | 725/77 |

OTHER PUBLICATIONS

International Search Report and Written Opinion of the International Searching Authority, Application No. PCT/US13/37136, Jul. 30, 2013, 14 pp.

* cited by examiner

*Primary Examiner* — Mushfikh Alam
(74) *Attorney, Agent, or Firm* — Myers Bigel Sibley & Sajovec, P.A.

(57) ABSTRACT

An aircraft in-flight entertainment system includes a plurality of seat electronic units (SEUs) that are daisy chained through a packet data network (PDN) loop to a content server containing media content. The SEU includes a power supply, a communication switch, a processor, a communication interface, and a power control circuit. The power supply supplies power to the communication switch, the processor, and the communication interface. The communication switch selectively routes packets containing media content through the processor and the communication interface to the video display unit, or through a segment of the PDN loop to a downstream electronic unit. The power control circuit responds to the power supply supplying less than a threshold level of power by supplying power to the communication switch from the segment of the PDN loop connected to the upstream electronic unit and/or the downstream electronic unit.

16 Claims, 6 Drawing Sheets

AIRCRAFT IN-FLIGHT ENTERTAINMENT SYSTEM WITH ROBUST DAISY-CHAINED NETWORK

TECHNICAL FIELD

The present disclosure relates to aircraft in-flight entertainment systems and, more particularly, to controlling power distribution in networked aircraft in-flight entertainment systems to provide fault tolerance.

BACKGROUND

In-flight entertainment (IFE) systems are deployed onboard aircraft to provide entertainment for passengers in a passenger cabin. The in-flight entertainment systems can provide passengers with video and audio content.

Typically, in-flight television programs are provided through personal video display units installed at each passenger seat or on overhead video display units that can be spaced over groups of seats. Audio content is provided through personal headsets connected to audio jacks installed in the seats, usually in the armrest of the seats. When installed at each passenger seat, all seats can be networked to a centralized content server to receive video/audio content. Ethernet is an example communications network that can be used for data packet communications between the content server, which is usually installed somewhere in an airplane hidden from the passengers view, and the seat electronic units Seat electronic units can be installed underneath a group of seats or to an individual seat to receive, decode and present the video/audio content to passengers. The seat electronic units can route commands and content between one or more content servers and the video display units in each seat, usually in the seat arm or the seat back, over a communications network.

In order to limit the enormous wiring requirements for such IFE systems and avoid multiple long runs of wires between content servers and seat electronic units (e.g., required for point-to-point (star) architecture, configurations), the seat electronic units are usually daisy-chained to each-other and wired back to the content servers creating a network loop. Availability of such in-flight entertainment systems is dependent on the health of all seat electronic units within the same network loop.

There is risk that a network loop can be broken when any one of the seat electronic units fails. The seat electronic units may be configured to communicate in both directions through the network loop to avoid loss of all communications when any one of the seat electronic units fails. However, failure of two or more seat electronic units can result in loss of communications to all seat electronic units that are located in the loop between the failed seat electronic units. Thus, daisy-chained network loops have the potential for low reliability/availability.

SUMMARY

Some embodiments of the present invention are directed to an entertainment system that includes a plurality of electronic units that are daisy chain connected by segments of a packet data network (PDN) loop to a content server containing media content. Each of the electronic units are connected to at least one video display unit. The electronic unit includes a power supply, a communication switch, a processor, a communication interface, and a power control circuit.

The power supply is powered from a source, which is separate from the PDN loop, and supplies power to the communication switch, the processor, and the communication interface. The communication switch selectively routes packets containing media content, received via a segment of the PDN loop connected to an upstream electronic unit, to: 1) the processor for communication through the communication interface to at least one video display unit connected to the electronic unit; or 2) through a segment of the PDN loop connected to a downstream electronic unit.

The power control circuit responds to the power supply supplying less than a threshold level of power to the communication switch, the processor, and/or the communication interface by supplying power to the communication switch from the segment of the PDN loop connected to the upstream electronic unit and/or from the segment of the PDN loop connected to the downstream electronic unit.

Thus, when the power supply fails, the seat electronic unit can continue to provide data packet forwarding operations so that data packets from upstream seat electronic units still flow through the failed seat electronic unit to downstream seat electronic units.

In some further embodiments, the seat electronic unit can operate in a reduced power consumption mode while using power from the PDN loop segments. In the reduced power consumption mode, the seat electronic unit can cease supplying power to the processor, to a connected video display unit, and/or other components. The communication switch may decrease its packet processing bandwidth to decrease its power consumption while operating in the reduced power consumption mode.

Some other embodiments are directed to related electronic units.

Other entertainment systems, electronic units, and methods according to embodiments of the invention will be or become apparent to one with skill in the art upon review of the following drawings and detailed description. It is intended that all such additional entertainment systems, electronic units, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of vehicle entertainment systems and related electronic units for vehicle entertainment systems are described herein which may provide benefit over prior vehicle entertainment systems, such as by improving fault tolerance and availability of systems. Although various embodiments of the present invention are explained herein in the context an aircraft in-flight entertainment systems, embodiments of entertainment systems and related electronic units are not limited thereto and may be used in other environments, including other vehicles such as ships, buses, and trains, as well as buildings such as conference centers, restaurants, businesses, and hotels, etc.

Figure 1:
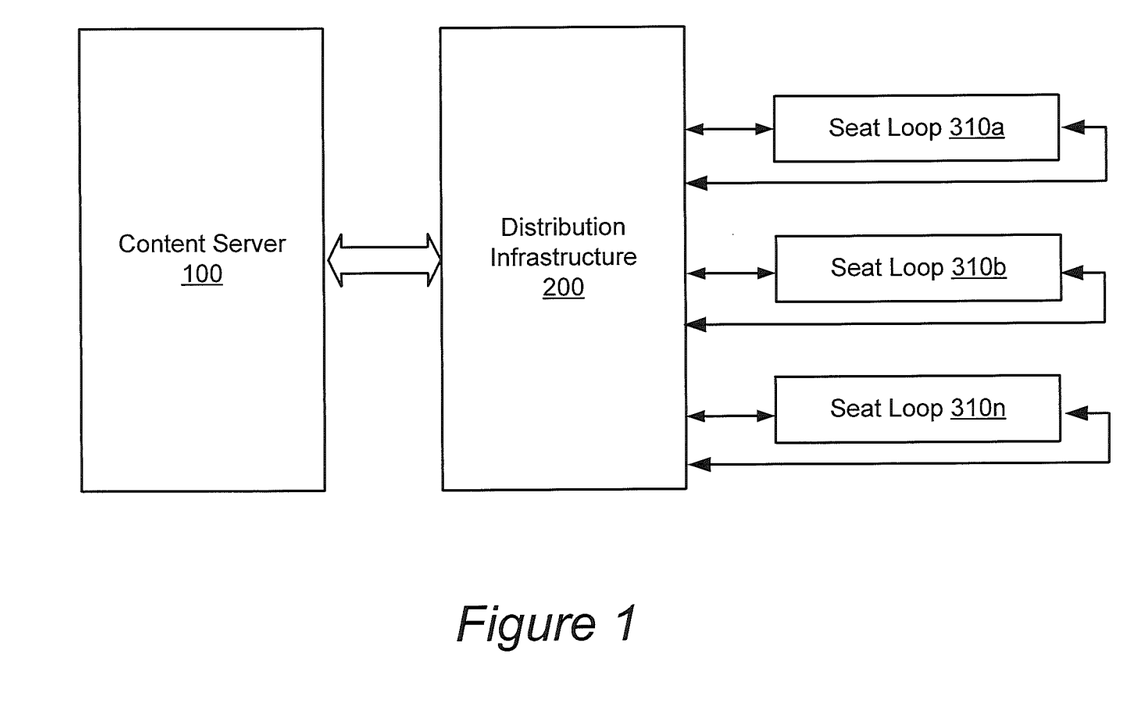
FIG. 1 illustrates a block diagram of an aircraft in-flight entertainment system according to some embodiments of the present invention.

FIG. 1 illustrates a block diagram of an aircraft in-flight entertainment system according to some embodiments of the present invention. The in-flight entertainment system includes a content server 100, distribution infrastructure 200, and a plurality of seat electronic units that are communicatively daisy chained to form a plurality of seat loops 310*a*, 310*b*, 310*n*.

The content server 100 can contain media content, such as movies, television programs, audio programs, and/or computer program applications that can be downloaded/streamed over the distribution infrastructure 200 to addressable seat electronic units within the seat loops 310*a*, 310*b*, 310*n*. The content server 100 may include a plurality of data servers or other mass storage devices that can store media content, and which may be replicated for fault tolerance or other reasons. Although FIG. 1 only depicts three seat loops for ease of illustration, the seat electronic units can be networked into any number of seat loops.

The distribution infrastructure 200 is a subsystem that routes digital data packets containing content from the content server 100 to addressed seat electronic units within particular ones of the seat loops 310*a*, 310*b*, 310*n*. The distribution infrastructure 200 may includes switches, routers and network cables and/or other network components. The distribution infrastructure 200 may be configured to satisfy unique requirements for use in an aircraft IFE system.

Figure 2:
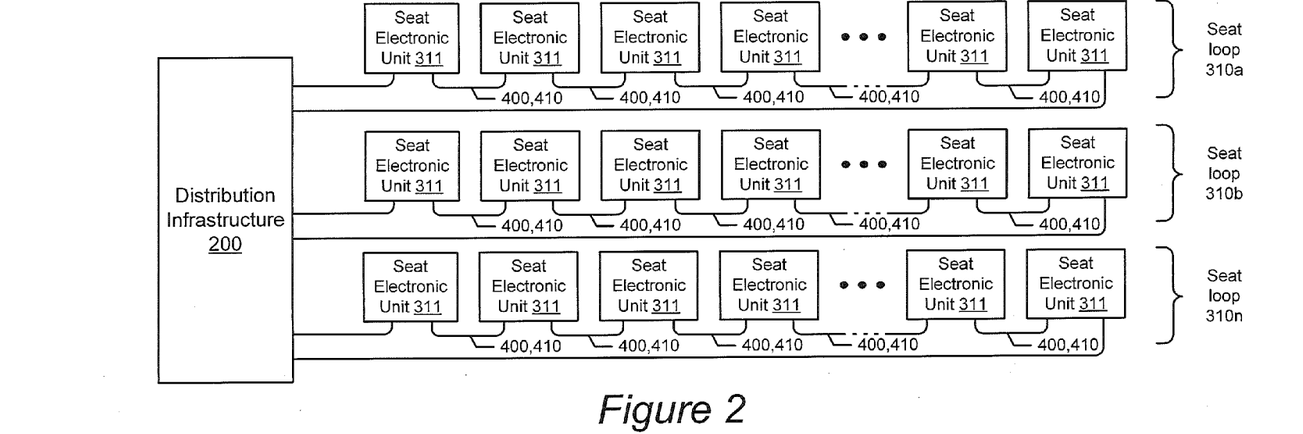
FIG. 2 illustrates daisy chained packet data network (PDN) loops of seat electronic units connected to a content server according to some embodiments of the present invention.

FIG. 2 illustrates example daisy chained packet data network (PDN) loops (forming the seat loops 310*a*, 310*b*, 310*n*) of seat electronic units 311 that are connected to the content server 100 (e.g., via the distribution infrastructure 200). Referring to FIG. 2, each of the seat loops 310*a*, 310*b*, 310*n* includes a plurality of seat electronic units 311 that are daisy chained together by a combination of wired PDN loop segments 400 which communicate data packets containing content, and separate dedicated power line segments 410 which supply power to the seat electronic units 311. In some embodiments, the PDN loop segments 400 are Ethernet connections having Ethernet compatible wiring to transport data packets, according to, for example, Ethernet 100 Base T or other networking communication standards such as 10 Base 2, 10 Base 5, 1000 Base T, 1000 Base X, Gigabit, or may be other types of data networks such as Asynchronous Transfer Mode (ATM).

The seat electronic units 311 are therefore connected to communicate data via PDN loop segments 400 with immediately adjacent seat electronic units 311 in the seat loop, or with the content server 100 when a seat electronic unit 311 is located on one the ends of the seat loop. The seat electronic units 311 are powered by the power line segments 410.

Figure 3:
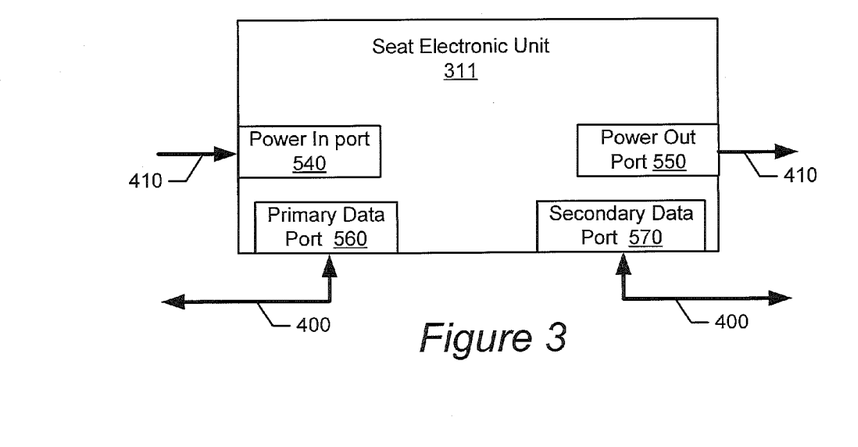
FIG. 3 illustrates some components of a seat electronic unit that operate according to some embodiments of the present invention.

FIG. 3 illustrates some components of a seat electronic unit 311 that operates according to some embodiments of the present invention. Referring to FIGS. 2 and 3, each seat electronic unit 311 can include a primary data port 560 that is connected to a PDN loop segment 400 to receive and/or send data packets to an upstream seat electronic unit 311 (which may be immediately adjacent on a first side of the seat loop), and a secondary data port 570 that is connected to another PDN loop segment 400 to receive and/or send data packets to a downstream seat electronic unit 311 (which may be immediately adjacent on an opposite second side of the seat loop).

The example seat electronic unit 311 can also include a power-in port 540 that is connected by a power line segment 410 to the upstream seat electronic unit 311 and a power out port 550 that is connected by a power line segment 410 to the downstream seat electronic unit 311.

In some embodiments, each of seat loops 310*a*, 310*b*, 310*n* communicates data packets containing content from the content server 100 in primarily one direction, or in only one direction, through each of the seat electronic units 311. For example, an upstream seat electronic unit 311 may forward data packets to an adjacent downstream seat electronic unit 311 which, in turn, forwards data packets to another adjacent downstream seat electronic unit 311, and so on through at least a portion of the seat loop until the data packet reaches one of the seat electronic units 311 that is addressed by the data packet (i.e., is the intended recipient unit for the data packet). Power may be provided in a daisy chained manner passing through each seat electronic unit 311 via the power line segments 410 in the same loop.

To avoid a seat loop from becoming become inoperative when one of the PDN loop segments 400 or power line segments 410 is cut/broken or when one of the seat electronic units 311 in the loop fails, the seat electronic units 311 can be configured to communicate in both directions through a loop and can be configured to receive power in both directions through the loop. Accordingly, the seat electronic unit 311 may, in some embodiments, use both data ports 560 and 570 to access content on the content server 100. This flexibility can enable a high level of availability of seat electronic units 311 even upon failure of one of the seat electronic units 311 and/or its associated wiring segment 400,410.

Each of the seat loops 310*a*, 310*b*, 310*n* can include a large number of seat electronic units 311, with a corresponding large number PDN loop segments 400 and associated power line segments 410 interconnecting the seat electronic units 311 into the daisy chained loops.

Figure 4A:
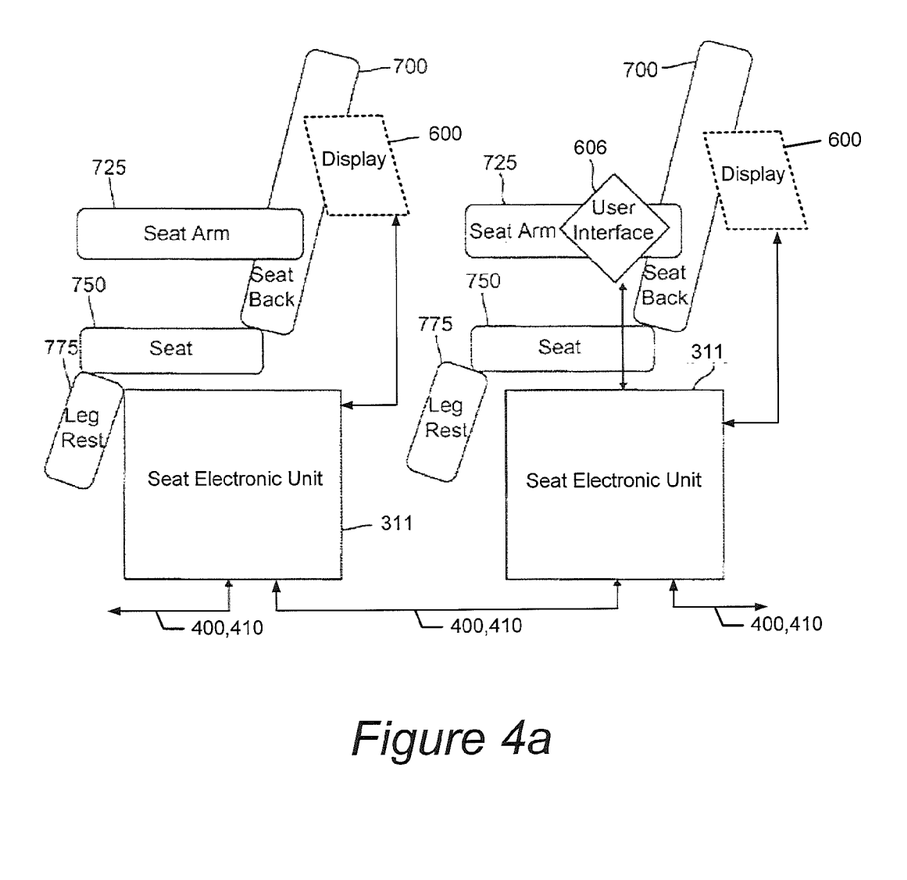
FIGS. 4a-4b illustrates example passenger seat configurations including seat electronic units which operate to route content to displays in accordance with some embodiments of the present invention.
Figure 4B:
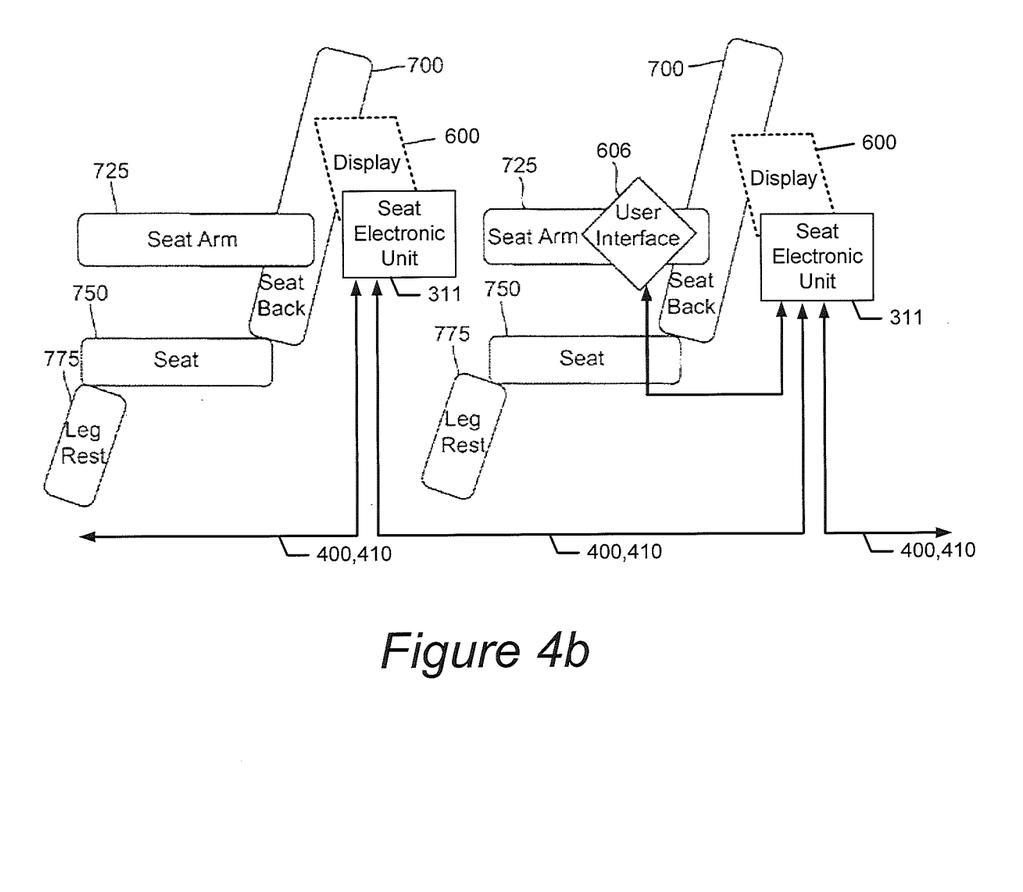

FIG. 4*a* illustrates an example passenger seat configuration that includes seat electronic units 311, which may be included in seat electronic boxes, and which operate to route content to video display units 600 to provide in-flight entertainment (IFE) system functionality. FIG. 4*b* illustrates another example passenger seat configuration that includes seat electronic units 311, which may be co-located with a video display unit 600 or may be proximately located to the video display unit (e.g., attached to the seat back 700, to the seat arm 725 of the passenger seat, or attached elsewhere), and which operate to route content to video display units 600 to provide in-flight entertainment (IFE) system functionality. The seat electronic units 311 may be located elsewhere relative to a seat or a group of seats and need not be located as shown in FIG. 4a or 4b.

As illustrated in FIGS. 4a-4b, the example seat configuration includes a seat 750, with a seat back 700, a seat arm 725, and a leg rest 775. A user interface 606, which may be connected to the seat arm 725 or may be adjacent to or part of the video display unit 600 (e.g., a touch sensitive display interface). The user interface 606 is connected to a processor 540 within a seat electronic unit 311 (as shown and described in connection with FIGS. 5 and 6 below).

Figure 5:
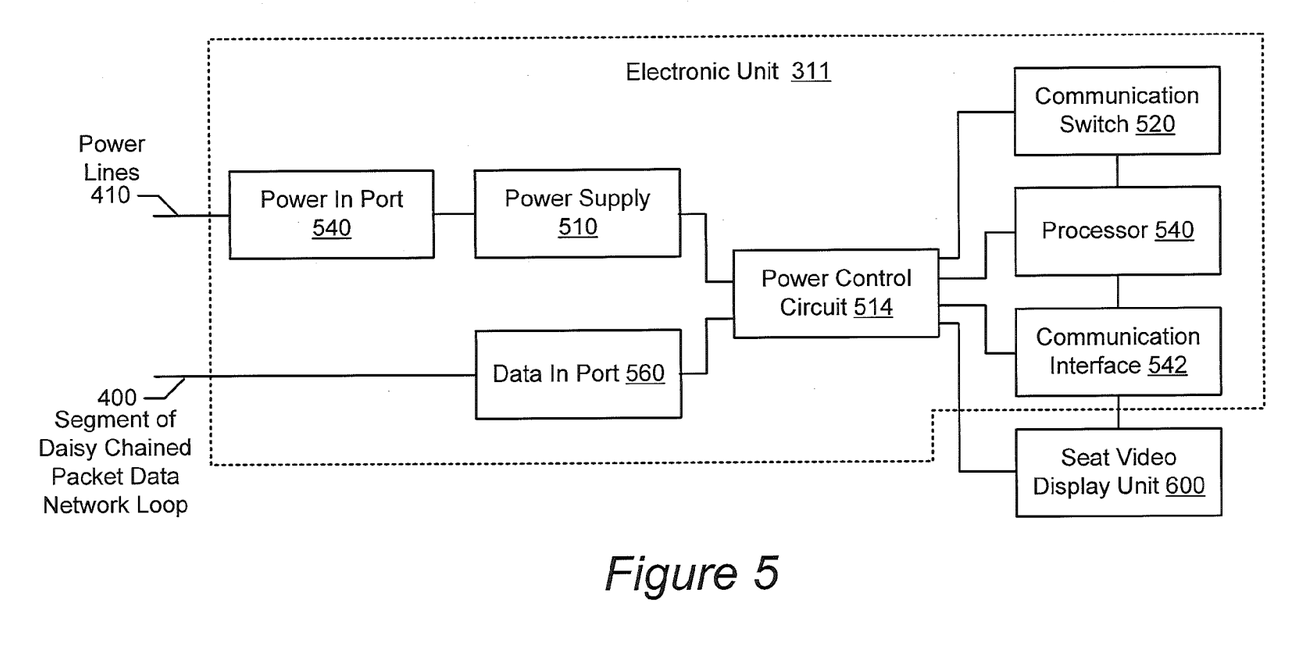
FIG. 5 illustrates in a simplified block diagram of an electronic unit that operates according to some embodiments of the present invention.
Figure 6:
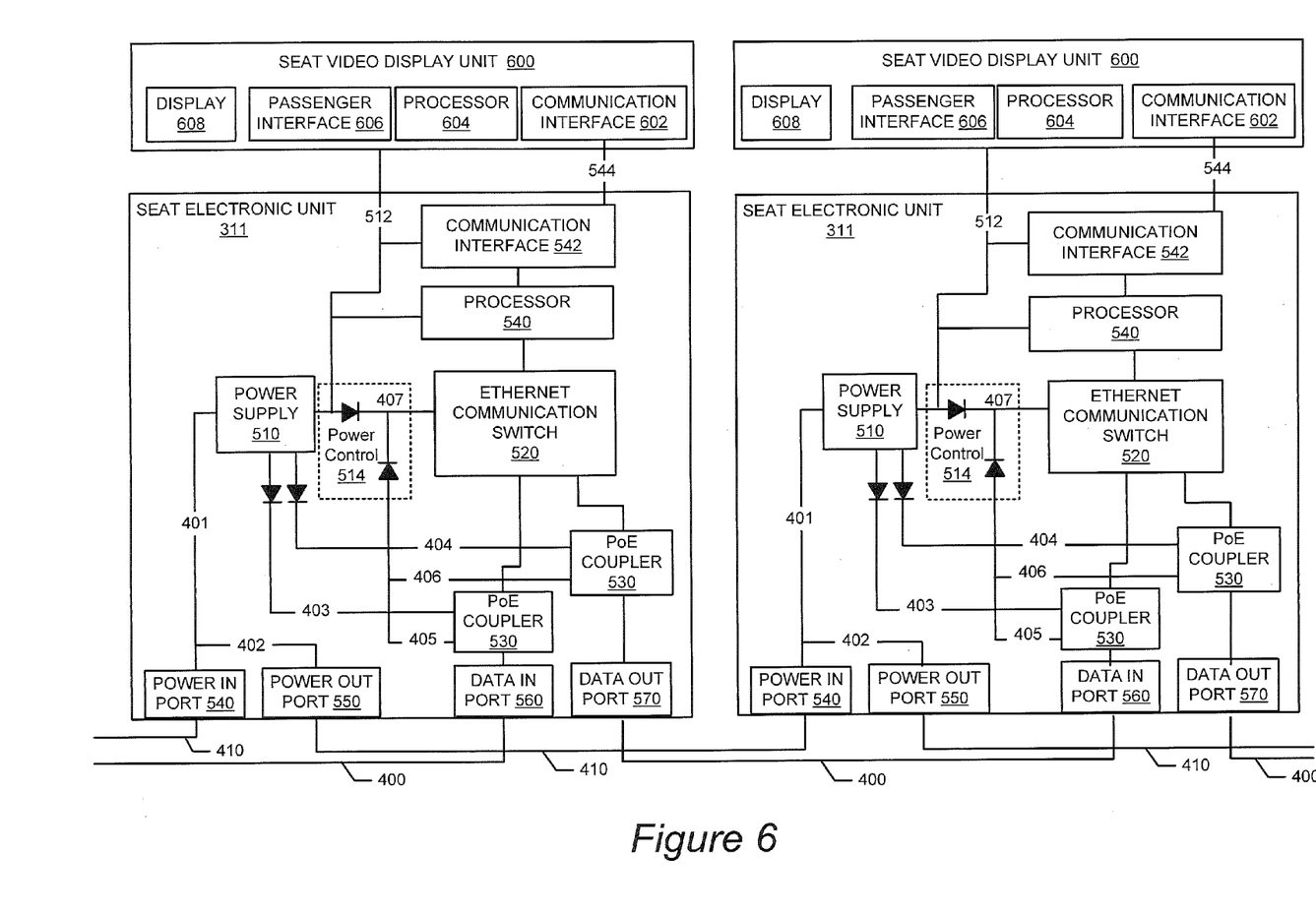
FIG. 6 illustrates further example components of seat electronic units and connected seat video display units that operate according to some embodiments of the present invention.

The processor 540 within the seat electronic unit 311 may be configured to request content from the content server 100 responsive to a user signaled request from the user interface 606, configured to extract and process content received in data packets from the content server 100, and configured to output video content to the connected video display unit 600 (which may be attached to a seat back 700 facing the passenger seat, attached the seat arm 725 of the passenger seat, or attached elsewhere) and output audio content to a headset jack through one or more communication interfaces 542 (FIGS. 5 and 6). The processor 540 may provide content to more than one video display unit 600, such as to the video display units 600 for a group of adjacent seats along a row.

As will be explained in further detail below, the reliability and availability of the in-flight entertainment system can be improved by various power control operations and methods by the seat electronic units 311 that are described below. These operations and methods may enable continued operation of seat electronic units 311 when two or more other seat electronic units 311 within the same seat loop experience a failure condition. These embodiments, may further avoid loss of communications with seat electronic units 311 that are located between two spaced apart failed seat electronic units 311 in the same seat loop, by avoiding formation of isolated non-communicative groups of seat electronic units 311 located between two or more failed seat electronic units 311.

According to various embodiments, when a power line segment 410 to a seat electronic unit 311 is cut/broken and/or when a power supply 510 (shown in FIGS. 5 and 6) of the seat electronic unit 311 fails (e.g., supplies less than a threshold level of power required for operation of the seat electronic unit 311 or stops supplying power), the seat electronic unit 311 is configured to then operate using power from the PDN loop segments 400 connected to adjacent other seat electronic units 311, instead of using power from the power line segments 410 via the power supply 510.

Moreover, the seat electronic unit 311 may operate in a reduced power consumption mode while using power from the PDN loop segments 400. In the reduced power consumption mode, the seat electronic unit 311 continues to provide data packet forwarding operations so that data packets from upstream seat electronic units 311 still flow through the failed seat electronic unit 311 to downstream seat electronic units 311. Thus, communications through the seat loops 310a, 310b, 310n can continue to occur through one or more partially failed seat electronic units 311.

In the reduced power consumption mode, power consumption is reduced by discontinuing at least some other normal functionality, such as discontinuing processing and forwarding of content to one or more connected video display units 600. Thus, those video display units 600 would not be capable of receiving and displaying video content from the content server 100.

FIG. 5 illustrates in a simplified block diagram of an electronic unit 311 that operates according to some embodiments of the present invention. The electronic unit 311 may correspond to a seat electronic unit, or may be located elsewhere in an aircraft or configured to operate with other types of entertainment systems. Referring to FIG. 5, a plurality of the electronic units 311 can be connected in a daisy chained packet data network (PDN) loop 400 to the content server 100. Each of the electronic units 311 are connected to at least one video display unit 600. The electronic unit 311 includes a power supply 510 that is powered from the power line segments 410, via a power in port 540, or from another source that is separate from the PDN loop 400, and supplies power to at least a communication switch 520, a processor 540, and a communication interface 542. The power supply 510 may also supply power to the seat video display unit 600 that is communicatively connected to the electronic unit 311.

The communication switch 520 selectively routes packets containing media content from an upstream electronic unit 311 in the PDN loop 400 to: 1) the processor 540 for communication through the communication interface 520 to the video display unit 600; or 2) to a downstream electronic unit 311 in the daisy chained PDN loop 400.

For example, the communication switch 520 can be configured to receive a packet containing media content from the content server 100 via the segment of the PDN loop 400 connected to the upstream electronic unit 311. The communication switch 520 identifies an address of the packet, determines whether the address corresponds to the video display unit 600, routes the media content to the processor 540 for communication through the communication interface 542 to the video display unit 600 when the address corresponds to the video display unit 600, and routes the packet through the segment of the PDN loop 400 connected to the downstream electronic unit 311 when the address does not correspond to the video display unit 600.

A power control circuit 514 responds to the power supply 510 supplying less than the threshold level of power (or ceasing to supply power) to the communication switch 520, the processor 540, and/or the communication interface 542 by supplying power from the segment of the PDN loop 400 (e.g., via a data-in port 560) connected to the upstream electronic unit 311 and/or the segment of the PDN loop 400 connected to the downstream electronic unit 311 to the communication switch 520 to continue operations to route packets to the downstream electronic unit. The electronic unit 311 can therefore continue to function while power from the power supply 510 is interrupted/failed by continuing to power the communication switch 520 using power drawn from the communication network (distribution infrastructure 200 providing the PDN loop 400).

Because the distribution infrastructure 200 providing the PDN loop 400 can be constrained to a relatively low level of power that it can supply, it is important to reduce the power consumption of the electronic unit 311 by not supplying power to the processor 540 and, in some further embodiments, by not supplying power to the communication interface 542, to the seat video display unit 600, and/or other components that are not required for continuing the packet forwarding operations through the electronic unit 311. Accordingly, the power control circuit 514 may supply power from the segment of the PDN loop 400 to the communication switch 520 without supplying power to at least the processor 540 (e.g., cease supplying power to at least the processor 540).

Supplying power to only the components needed for continuing the packet forwarding operations can avoid drawing an excessive level of power from the segments of the PDN loop 400 which could negatively affect operation of the distribution infrastructure 200. More particularly, the reduced power consumption mode of the electronic unit 311 should be configured to not draw more power from a segment of the PDN loop 400 than the connected adjacent electronic unit 311 and/or distribution infrastructure 200 can supply without causing excessive interference (e.g., excessive bit error rate) and/or failure of data packet communications to/from the electronic unit 311 and the adjacent electronic units 311.

The communication switch 520 may be configured to operate with a normal power consumption mode, which is used when power is supplied by the power supply 510, and a reduced power consumption, which is used when power is supplied from a segment of the PDN loop 400. For example, the communication switch 520 can be configured to switch to the reduced power consumption mode by decreasing its packet processing bandwidth (e.g., reducing a processor clock rate, periodically/aperiodically entering a lower power sleep/idle state) to decrease its power consumption. The communication switch 520 may switch to the reduced power consumption mode by ceasing routing media content from received packets to the processor 540 when the packet address corresponds to the video display unit 600, in order to consume less power. Alternatively or additionally, the communication switch 520 may switch to the reduced power consumption mode by ceasing identification of an address of packets and ceasing determination of whether the address corresponds to the video display unit 600, in order to consume less power.

The power control circuit 514 may be configured to electrically isolate the communication switch 520 from the power supply 514, the processor 540, and/or other components of the electronic unit 311 that are not required for continuing the packet forwarding operations, while the power control circuit 514 supplies power from the segment of the PDN loop 400 in response to the power supply supplying less than the threshold level of power. For example, the power control circuit 514 may include semiconductor switches and/or electromechanical switches that can be controlled to isolate power and/or communication pathways between the communication switch 520 and these other components.

In a further embodiment, the power control circuit 514 may be configured to electrically isolate the video display unit 600 from the communication switch 520 to avoid loss of power from the communication switch 520 to the video display unit 600 and, thereby, reduce power consumption by the communication switch 520.

Such electrical isolation can reduce the power consumption of the electronic unit 311 to avoid attempting to draw an excessive level of power from the PDN loop 400 (e.g., avoid needing more power than the one or both adjacent electronic units 311 can supply through the network connection).

The power control circuit 514 may include semiconductor switches (e.g., diode or transistor based switches) and/or electro-mechanical switches that can switch or be switched to selectively provide power from the power supply 510 or the segment of the PDN loop 400 to the communication switch 520. Analog controlled semiconductor switches and electromechanical switches may be more reliable and less costly to implement than a digital processor based approach. Moreover, because semiconductor switches can be switched more quickly than electro-mechanical switches and with more signal continuity before and after switching, using semiconductor switches may avoid or reduce any interruption of power to the communication switch 520 when switching from supplying power from the power supply to instead supplying power from a segment of the PDN loop 400. In some embodiments, the power control circuit 514 may also use semiconductor switches and/or electro-mechanical switches to electrically isolate connected elements of the electronic unit 311 to reduce power consumption of the electronic unit 311 while the communication switch 520 is being powered by the segment of the PDN loop 400.

In one embodiment, the communication switch 520 is an Ethernet router that is connected to an Ethernet loop 400 terminated by an adjacent seat electronic unit 311. The power control circuit 514 can be configured to respond to the power supply 510 supplying less than the threshold level of power to the communication switch 520, the processor 540, and/or the communication interface 542 by supplying power to the communication switch 520 from an Ethernet network connection to the upstream electronic unit 311 and/or from an Ethernet network connection to the downstream electronic unit 311.

When a power line segment 410 to the power supply 510 is cut/broken or when the power supply 510 abruptly fails, depending upon the responsiveness of the power control circuit 514 and responsive availability of power from the PDN loop 400, there may be a brief time when the communication switch 520 is insufficiently powered to continue operation. Consequently, the packet network connection to the adjacent upstream and downstream electronic units 311 may be lost. In one embodiment, the communication switch 520 is configured to automatically initiate reestablishment of a packet network connection (e.g., an Ethernet connection) between the seat electronic unit 311 and the upstream electronic unit 311 and/or the downstream electronic unit 311 in response to the power control circuit 514 initiating supply of power from a segment of the PDN loop 400 to the upstream and/or downstream upstream electronic unit 311.

As explained above, an electronic unit 311 can supply power through a segment of the PDN loop 400 to another upstream/downstream electronic unit 311 to enable the other electronic unit 311 to continue to forward packets through the PDN loop 400. When more than one electronic unit 311 in a loop has failed, depending upon the spacing of the failed electronic units 311 in the loop, the burden can become excessive for another adjacent electronic node 311 to attempt to supply sufficient power through one or more segments of the PDN loop 400 to adjacent failed electronic units 311. Accordingly, the failed electronic units 311 may operate to sense when an adjacent functioning electronic unit 311 (e.g., upstream unit) is become overburdened and compensate by drawing more power from another adjacent functioning electronic unit 311 (e.g., downstream unit).

In one embodiment, the power control circuit 514 can contain circuitry that compensates for a drop in power from the segment of the PDN loop 400 connected to the upstream electronic unit or the downstream electronic unit by increasing power drawn from the segment of the PDN loop 400 connected to the other one of the upstream electronic unit or the downstream electronic unit.

In another embodiment, the power control circuit 514 can be configured to pass-through excess power, which is not consumed by the communication switch 520, from the segment of the PDN loop 400 connected to the upstream electronic unit or the downstream electronic unit to the segment of the PDN loop 400 connected to the other one of the upstream electronic unit or the downstream electronic unit.

FIG. 6 illustrates further example components of seat electronic units 311 and connected seat video display units 600 that operate according to some embodiments of the present invention. In the embodiment of FIG. 6, the seat electronic unit 311 is connected through a power-in port 540 to a power line segment 410 to receive power from an upstream seat electronic unit 311, and is connected through a data-in port 560 to an Ethernet loop segment 400 to receive data packets from the upstream seat electronic unit 311. The seat electronic unit 311 similarly passes power from the power-in port 540 (via connection 402) through a power-out port 550 to a power line segment 410 to supply power to an upstream seat electronic unit 311, and forwards data packets (not addressed to its connected seat video display unit 600) through a data-out port 570 and an Ethernet loop segment 400 to the downstream seat electronic unit 311. Power and data packets are thereby daisy chained through seat electronic units 311 in a same loop.

The power line segments 410 may be a pair of wires carrying direct or alternating current, and may be provided by separate cabling from all wiring of the Ethernet loop segment 400 to avoid undesirable electromagnetic interference by cross-coupling there between. The wiring of the Ethernet loop segment 400 may be carried through cabling having shielding configured to reduce electromagnetic interference at signaling frequencies of data transported through the Ethernet loop segment 400.

A power supply 510 receives power from the power line segment 410 (via connection 401), and supplies power to a power control circuit 514, an Ethernet communication switch 520, a processor 540, a communication interface 542, and components of the seat video display unit 600 (via connection(s) 512), each of which can be configured to operate as described above.

The seat video display unit 600 may include a display device 608, a passenger interface 606 (e.g. a touch screen interface and/or switches/buttons), a processor 604, and a communication interface 602 that are configured to provide conventional in-flight entertainment functionality for one or more passengers. The communication switch 520 can provide media content from data packets, which are addressed to the seat video display unit 600, to the processor 540 for formatting and communication through the communication interface 542, connection 544, and communication interface 602, for processing by processor 604.

The processors 540 and 604 may each include one or more data processors, such as a general purpose and/or special purpose processor (e.g., microprocessor and/or digital signal processor), and memory (internal/external memory device(s)). The processors 540 and 604 are configured to execute computer program instructions from the memory, described below as a computer readable media, to perform at least some of the operations and methods described herein in accordance with one or more embodiments of the present invention.

The Ethernet communication switch 520 is connected to the data-in port 560 through a power over Ethernet (PoE) coupler 530, which is powered by the power supply 510. The Ethernet communication switch 520 is similarly connected to the data-out port 570 through another PoE coupler 530, which is powered by the power supply 510.

In response to the power supply 510 supplying less than a threshold level of power to the Ethernet communication switch 520, the processor 540, and/or the communication interface 542 (e.g., when the power supply 510 wholly/partially fails or the power line segment 410 fails), the power control circuit 514 supplies power to the Ethernet communication switch 520 from the PoE coupler 530 connected to the data-in port 560 and the PoE coupler 530 connected to the data-out port 560. The PoE couplers 530 are configured to pass electrical power and data through Ethernet cabling 400 (e.g., Category 5 cabling). The power may be supplied in common mode over two or more differential pairs of wires of the Ethernet cable. Moreover, in accordance with some embodiments herein, the PoE couplers 530 are also configured to extract power from Ethernet waveforms from the Ethernet segments 400 (via the data-in port 560/data out port 570 and distribution infrastructure 200), and provide at least some of the power through the connections 405/406 to the power control circuit 514.

In the embodiment of FIG. 6, the power control circuit 514 can include a pair of semiconductor diode devices, one of which restricts current flow to one direction from the power supply 510 to the Ethernet communication switch 520 and the other of which restricts current flow to one direction from the pair of PoE couplers 530 to the communication switch 520 (via connections 405 and 406). Accordingly, a drop in current level from the power supply 510 can be compensated for by a rise in current level from the pair of PoE couplers 530, so that the communication switch 520 can continue to receive a level of power that is sufficient to maintain it operational capabilities to receive data packets from the upstream electronic unit 311 and forward the data packets to the downstream seat electronic unit 311. Other components required for receiving and forwarding data packets through this electronic unit 311 (e.g., circuitry associated with the PoE couplers 530, the data-in port 560, and the data-out port 570) can be similarly powered by the Ethernet segments 400.

Further Definitions:

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

For the sake of brevity, conventional electronics, systems, and software functional aspects of the systems (and components of the individual operating components of the systems) may not be described in detail. Furthermore, the connecting lines, or connectors shown in the various figures presented are intended to represent example communication/functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The use of any and all examples, or exemplary language (e.g., "such as") provided herein, is intended merely to better illuminate the invention and does not pose a limitation on the scope of the invention unless otherwise claimed. The use of the terms "a" and "an" and "the" and similar referents in the context of describing the invention (especially in the context of the following claims) are to be construed to cover both the singular and the plural, unless the context unambiguously indicates otherwise. In addition, it should be understood that although the terms "first," "second," etc. may be used herein to describe various elements, these elements should not be limited by these terms, which are only used to distinguish one element from another. The term "and/or", abbreviated "/", includes any and all combinations of one or more of the associated listed items.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable media that can direct a computer or other programmable data processing apparatus to function in a particular manner, such that the instructions stored in the computer-readable media produce an article of manufacture including instructions which implement the functions/acts specified in the block diagrams and/or flowchart block or blocks.

A tangible, non-transitory computer-readable media may include an electronic, magnetic, optical, electromagnetic, or semiconductor data storage system, apparatus, or device. More specific examples of the computer-readable media would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing device to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

What is claimed:
1. An entertainment system in an aircraft comprising:
a plurality of electronic units that are daisy chain connected by segments of a packet data network (PDN) loop to a content server containing media content, and each of the electronic units are connected to at least one seat video display unit and comprise:
a power supply that is powered from a source, which is separate from the PDN loop, and supplies power to a communication switch, a processor, and a communication interface,
wherein the communication switch selectively routes packets containing media content, received via a segment of the PDN loop connected to an upstream electronic unit, to: a) the processor for communication through the communication interface to at least one seat video display unit connected to the electronic unit; or b) through a segment of the PDN loop connected to a downstream electronic unit; and
a power control circuit that responds to the power supply supplying less than a threshold level of power to the communication switch, the processor, and/or the communication interface by supplying power to the communication switch from the segment of the PDN loop connected to the upstream electronic unit and/or from the segment of the PDN loop connected to the downstream electronic unit;

wherein the communication switch is configured to:
receive a packet containing media content from the content server via the segment of the PDN loop connected to the upstream electronic unit;
identify an address of the packet;
determine whether the address corresponds to the at least one seat video display unit connected to the electronic unit;
route the media content to the processor for communication through the communication interface to the corresponding seat video display unit when the address corresponds; and
route the packet through the segment of the PDN loop connected to the downstream electronic unit when the address does not correspond; and
wherein the power control circuit responds to the power supply supplying less than the threshold level of power to the communication switch, the processor, and/or the communication interface by supplying power, from the segment of PDN network connected to the upstream electronic unit and/or the segment of PDN network connected to the downstream electronic unit, to the communication switch to continue operations to route packets to the downstream electronic unit
wherein the communication switch is configured to cease performing operations to route the media content to the processor to consume less power while receiving power through the power control circuit from the segment of the PDN loop connected to the upstream electronic unit and/or from the segment of the PDN loop connected to the downstream electronic unit.

2. The entertainment system of claim 1, wherein:
the communication switch is an Ethernet router connected to an Ethernet loop; and
the power control circuit is configured to respond to the power supply supplying less than the threshold level of power to the communication switch, the processor, and/or the communication interface by supplying power to the communication switch from an Ethernet network connection to the upstream electronic unit and/or from an Ethernet network connection to the downstream electronic unit.

3. The entertainment system of claim 1, wherein:
the power control circuit further responds to the power supply supplying less than a threshold level of power to the communication switch, the processor, and/or the communication interface by ceasing supply of power to the processor and by supplying power to the communication switch from the segment of the PDN loop connected to the upstream electronic unit and/or the segment of the PDN loop downstream electronic unit.

4. The entertainment system of claim 1, wherein:
the power supply is further configured to supply power to the at least one seat video display unit connected to the electronic unit; and
the power control circuit further responds to the power supply supplying less than a threshold level of power to the communication switch, the processor, and/or the communication interface by ceasing supply of power to the at least one seat video display unit and by supplying power to the communication switch from the segment of the PDN loop connected to the upstream electronic unit and/or the segment of the PDN loop downstream electronic unit.

5. The entertainment system of claim 1, wherein:
the communication switch is configured to cease performing operations for routing the media content to the processor by ceasing identifying an address of the packet and/or ceasing determining whether the address corresponds to the at least one seat video display unit to consume less power while receiving power through the power control circuit from the segment of the PDN loop connected to the upstream electronic unit and/or from the segment of the PDN loop connected to the downstream electronic unit.

6. The entertainment system of claim 1, wherein:
the communication switch is configured to decrease its packet processing bandwidth to decrease its power consumption while receiving power through the power control circuit from the segment of the PDN loop connected to the upstream electronic unit and/or from the segment of the PDN loop connected to the downstream electronic unit.

7. The entertainment system of claim 1, wherein:
the communication switch is configured to reestablish a packet network connection to the upstream electronic unit and to the downstream electronic unit in response to the power control circuit initiating supply of power from the segment of the PDN loop connected to the upstream electronic unit and/or from the segment of the PDN loop connected to the downstream electronic unit.

8. The entertainment system of claim 1, wherein:
the power control circuit responds to the power supply supplying less than the threshold level of power to the communication switch, the processor, and/or the communication interface by electrically isolating the communication switch from the power supply while supplying power from the segment of the PDN loop connected to the upstream electronic unit and/or from the segment of the PDN loop connected to the downstream electronic unit.

9. The entertainment system of claim 1, wherein:
the power control circuit contains circuitry configured to compensate for a drop in power from the segment of the PDN loop connected to one of the upstream electronic unit and the downstream electronic unit by increasing power drawn from the segment of the PDN loop connected to the other one of the upstream electronic unit and the downstream electronic unit.

10. The entertainment system of claim 1, wherein:
the power control circuit is further configured to pass-through excess power, which is not consumed by the communication switch, from the segment of the PDN loop connected to one of the upstream electronic unit and the downstream electronic unit to the segment of the PDN loop connected to the other one of the upstream electronic unit and the downstream electronic unit.

11. An electronic unit for an entertainment system in an aircraft, the electronic unit comprising:
a communication interface connected to a seat video display unit;
a processor that communicates through the communication interface with the seat video display unit;
a communication switch that receives a packet containing media content from a content server, via a segment of a packet data network (PDN) loop connected to an upstream electronic unit, that identifies an address of the packet, and that selectively routes the media content to the processor for communication to the seat video display unit or to a downstream electronic unit through another segment of the PDN loop responsive to the address of the packet;

a power supply that receives power from a power line, which is separate from the PDN loop, and supplies power to the communication switch, the processor, and the communication interface; and a power control circuit that responds to the power supply supplying less than a threshold level of power to the communication switch, the processor, and/or the communication interface by supplying power to the communication switch from the segment of the PDN loop connected to the upstream electronic unit and/or from the segment of the PDN loop connected to the downstream electronic unit;

wherein the communication switch is configured to:

receive the packet via the segment of the PDN loop connected to the upstream electronic unit;

determine whether the address of the packet corresponds to the seat video display unit;

route the media content to the processor for communication through the communication interface to the seat video display unit when the address corresponds; and route the packet through the segment of the PDN loop connected to the downstream electronic unit when the address does not correspond; and wherein the power control circuit responds to the power supply supplying less than the threshold level of power to the communication switch, the processor, and/or the communication interface by supplying power, from the segment of PDN network connected to the upstream electronic unit and/or the segment of PDN network connected to the downstream electronic unit, to the communication switch to continue operations to route packets to the downstream electronic unit;

wherein the communication switch is configured to cease performing operations to route the media content to the processor to consume less power while receiving power through the power control circuit from the segment of the PDN loop connected to the upstream electronic unit and/or from the segment of the PDN loop connected to the downstream electronic unit.

12. The electronic unit of claim 11, wherein:

the electronic unit comprises a seat electronic unit that is configured to be connected to a passenger seat in an aircraft and to supply the media content to a seatback video display unit connected to the passenger seat.

13. The electronic unit of claim 11, wherein:

the communication switch is an Ethernet router connected to an Ethernet loop; and the power control circuit is configured to respond to the power supply supplying less than the threshold level of power to the communication switch, the processor, and/or the communication interface by supplying power to the communication switch from an Ethernet network connection to the upstream electronic unit and/or from an Ethernet network connection to the downstream electronic unit.

14. The electronic unit of claim 11, wherein:

the power control circuit responds to the power supply supplying less than the threshold level of power to the communication switch, the processor, and/or the communication interface by ceasing supply of power to the processor and by supplying power to the communication switch from the segment of the PDN loop connected to the upstream electronic unit and/or the segment of the PDN loop downstream electronic unit.

15. The electronic unit of claim 11, wherein:

the communication switch is configured to operate in a reduced power consumption mode while receiving power through the power control circuit from the segment of the PDN loop connected to the upstream electronic unit and/or from the segment of the PDN loop connected to the downstream electronic unit, by the communication switch ceasing identifying an address of the packet and/or ceasing determining whether the address corresponds to the at least one seat video display unit.

16. The electronic unit of claim 11, wherein:

the communication switch is configured to decrease its packet processing bandwidth to decrease its power consumption while receiving power through the power control circuit from the segment of the PDN loop connected to the upstream electronic unit and/or from the segment of the PDN loop connected to the downstream electronic unit.

* * * * *